(12) United States Patent
Chen et al.

(10) Patent No.: US 9,079,669 B2
(45) Date of Patent: Jul. 14, 2015

(54) ICING DETECTOR PROBE AND ICING DETECTOR WITH THE SAME

(75) Inventors: Yingchun Chen, Shanghai (CN); Lin Ye, Wuhan (CN); Miao Zhang, Shanghai (CN); Junfeng Ge, Wuhan (CN); Lijuan Feng, Shanghai (CN); Tiejun Liu, Shanghai (CN); Feng Zhou, Shanghai (CN)

(73) Assignees: COMMERCIAL AIRCRAFT CORPORATION OF CHINA, LTD, Shanghai (CN); COMMERCIAL AIRCRAFT CORPORATION OF CHINA, LTD SHANGHAI AIRCRAFT DESIGN AND RESEARCH INSTITUTE, Shanghai (CN); HUAZONG UNIVERSITY OF SCIENCE & TECHNOLOGY, Hubei (CN)

( * ) Notice: Subject to any disclaimer, the term of this patent is extended or adjusted under 35 U.S.C. 154(b) by 194 days.

(21) Appl. No.: 13/809,934

(22) PCT Filed: Jun. 30, 2011

(86) PCT No.: PCT/CN2011/076610
§ 371 (c)(1),
(2), (4) Date: Jan. 14, 2013

(87) PCT Pub. No.: WO2012/006930
PCT Pub. Date: Jan. 19, 2012

(65) Prior Publication Data
US 2013/0105631 A1 May 2, 2013

(30) Foreign Application Priority Data
Jul. 16, 2010 (CN) .......................... 2010 1 0229387

(51) Int. Cl.
*B64D 15/20* (2006.01)

(52) U.S. Cl.
CPC ...................................... *B64D 15/20* (2013.01)

(58) Field of Classification Search
CPC ........ B54D 15/20; B54D 15/22; B54D 15/16; B64D 2033/0233; B64D 2033/0226
USPC ........... 244/134 F, 134 R; 340/580, 581, 962; 73/170.26
See application file for complete search history.

(56) References Cited

U.S. PATENT DOCUMENTS 2,766,619 A * 10/1956 Tribus et al. ............... 73/170.26
3,116,395 A * 12/1963 Byrne et al. .................. 219/201

(Continued)

FOREIGN PATENT DOCUMENTS

| CN | 1673035 A | 9/2005 |
|----|-----------|--------|
| WO | WO 9916034 A1 | 4/1999 |
| WO | WO 03/002410 | 1/2003 |

OTHER PUBLICATIONS

International Search Report, issued Aug. 25, 2011.

*Primary Examiner* — Benjamin P Lee
(74) *Attorney, Agent, or Firm* — Dority & Manning, P.A.

(57) ABSTRACT

An icing detector probe includes three sections arranged sequentially along the direction of air flow, namely, a first section, a second section and a third section. The shape of the outer surface of the first section is suitable for collecting droplets in the air flow. The shape of the outer surface of the second section is suitable for full decelerating and releasing latent heat of large droplets during their movements. The outer surface of the third section is suitable for icing of large droplets. The probe detects icing by distinguishing and identify large droplets icing. The probe effectively detects types of traditional icing, thus being helpful for exact detection of icing thickness. An icing detector including said icing detector probe is also provided.

17 Claims, 2 Drawing Sheets

(56) References Cited

U.S. PATENT DOCUMENTS

| | | | |
|---|---|---|---|
| 5,003,295 A | 3/1991 | Kleven | |
| 5,313,202 A * | 5/1994 | Hansman et al. | 340/962 |
| 5,398,547 A * | 3/1995 | Gerardi et al. | 73/170.26 |
| 5,575,440 A * | 11/1996 | LeBlond et al. | 244/134 F |
| 6,269,320 B1 * | 7/2001 | Otto | 702/127 |
| 6,320,511 B1 * | 11/2001 | Cronin et al. | 340/580 |
| 6,347,767 B1 | 2/2002 | Holmen | |
| 6,759,962 B2 | 7/2004 | Severson et al. | |
| 7,000,871 B2 * | 2/2006 | Barre et al. | 244/134 F |
| 7,014,359 B2 * | 3/2006 | Suga | 374/208 |
| RE39,295 E * | 9/2006 | Cronin et al. | 340/580 |
| 7,104,502 B2 * | 9/2006 | Otto et al. | 244/134 F |
| 7,191,643 B2 * | 3/2007 | Rasmussen et al. | 73/170.26 |
| 2002/0158768 A1 | 10/2002 | Severson et al. | |
| 2004/0231410 A1 | 11/2004 | Bernard et al. | |
| 2005/0103927 A1 | 5/2005 | Barre et al. | |
| 2005/0218268 A1 * | 10/2005 | Otto et al. | 244/134 F |
| 2005/0230553 A1 * | 10/2005 | Otto et al. | 244/134 F |
| 2005/0268710 A1 * | 12/2005 | Rasmussen et al. | 73/170.26 |
| 2014/0184789 A1 * | 7/2014 | Meis et al. | 348/135 |

* cited by examiner

ICING DETECTOR PROBE AND ICING DETECTOR WITH THE SAME

CROSS-REFERENCE TO RELATED APPLICATIONS

This application claims priority to International Application Serial No. PCT/CN2011/076610, filed Jun. 30, 2011, which claims priority to Chinese Application No. 201010229387.X filed Jul. 16, 2010. International Application Serial No. PCT/CN2011/076610 is hereby incorporated herein for all purposes by this reference.

FIELD OF THE INVENTION

The present invention relates to a probe for use in an ice detector and an ice detector including such probe, which is particularly adapted to detect ice conditions on a surface of an aircraft.

BACKGROUND OF THE INVENTION

In the field of aircraft ice protection, people usually call water droplets with a median volumetric diameter (MVD) of less than 50 microns normal-state water droplets, and call water droplets with a median volumetric diameter of above 50 microns large water droplets.

Abnormal-state ice caused by supercooled large droplets (SLD) always presents difficulty in aircraft ice protection and ice detection. This is because large water droplets have a larger mass than normal-state water droplets and therefore have a larger inertia and greater internal latent heat, so they are more likely to flow on the surface of the aircraft during icing and need to consume longer time. As such, when supercooled large water droplets contact a surface of an object, they will not, like normal-state water droplets, ice quickly at a contact portion or its vicinity, but move a certain distance on the surface of the object and then get iced. In this way, icing might happen at none-icing-protection positions of the aircraft such as at upper and lower airfoil surfaces after a front edge of the airfoil and a tail wing so as to form the so-called "backflow ice". Such icing is more dangerous to the flying safety of the aircraft than the normal-state icing.

Currently, people have already developed several kinds of detectors for detecting supercooled large water droplets, for example, two patents with publication number US2002/0158768A1 and WO03/002410A1. The basic technical solution thereof is as follows: different flow channels or water droplet capturing flow fields are designed for normal-state water droplet and large water droplets, and two independent ice detectors are applied so that the ice of normal-state water droplets and the large water droplets is respectively frozen on the two ice detectors so as to identify and detect the abnormal-state icing of the large water droplets. Such device is capable of achieving identification and detection of large water droplets, but it is disadvantageous in a complicated detector structure, a large size and difficulty in processing.

In addition, regarding normal-state water droplets with a median volumetric diameter of less than 50 microns, various current ice detectors still have drawbacks hard to overcome in terms of icing detection. This is the reason why it is impossible to perform accurate judgment of types of icing (e.g., clear ice, rime ice or mixed ice) caused by the normal-state water droplets so that an error of a measurement of a thickness of an ice layer is caused when the thickness of the ice layer is detected. This is because ices with the same thickness but in different types require different detection electrical signals. Hence, the same electrical signal might indicate various icing conditions with different types and different thicknesses. As such, it is difficult to make an accurate judgment of the thickness of the ice after the detection signal is received.

Additionally, it is noticeable that the term "ice" mentioned in the present application shall include various types of ice, frost and mixtures thereof.

SUMMARY OF THE INVENTION

An objective of the present invention is to provide an ice detector probe to solve the above technical problems. In the ice detector probe, the probe has a certain dimension in an air flow direction so that water droplets in the air flow having different median volumetric diameters form ice at different positions in the air flow direction so as to distinguish normal-state water droplets from large water droplets and distinguish normal-state water droplets in different ranges of median volumetric diameters. As such, accurate detection of the large water droplets can be implemented.

According to one aspect of the present invention, there is provided an ice detector probe, comprising three segments provided in turn in the air flow direction, wherein an outer surface of a first segment is shaped for adapting to collect water droplets in the air flow; an outer surface of a second segment is shaped to enable large water droplets to sufficiently decelerate and release latent heat during movement; an outer surface of a third segment is configured to enable large water droplets to get iced thereon.

By this arrangement, normal-state water droplets can substantially finish a procedure of decelerating and releasing heat and form ice before they come to the outer surface of the third segment, so that water droplets forming ice at the outer surface of the third segment are almost totally large water droplets. As such, normal-state water droplets will not exert an influence on detection of the large water droplets, thereby effectively improving the accuracy in detecting the icing of the large water droplets.

Preferably, the second segment may have a certain length so as to enable the normal-state water droplets to finish icing and the large water droplets to substantially achieve deceleration and release of latent heat.

Preferably, the outer surface of the second segment is shaped to enable the large water droplets to be essentially continuously subjected to an action of a boundary layer during movement. In this way, it may be ensured that the large water droplets move along the outer surface of the probe during movement and may not be blown away by the air flow.

Preferably, the second segment may comprise a normal-state icing area for normal-state water droplets to get iced thereon.

Preferably, the normal-state icing area is substantially like a wedge as viewed from one side. The outer surface of the wedge shape may effectively achieve deceleration and release of heat of water droplets, and meanwhile, the water droplets may not be blown away by the air flow. Furthermore, the outer surface of the wedge shape may further improve a capturing capability of the whole probe for the water droplets in the air flow.

Preferably, the normal-state icing area comprises a substantially planar portion.

Certainly, the meaning of the above wedge shape and planar portion shall include the situation that the outer surface has a certain arc.

Preferably, the normal-state icing area, under the outer surface thereof, comprises a plurality of ice detecting means disposed in the air flow direction. Furthermore, the first segment may also comprise an ice detecting means. The series of ice detecting means disposed in the air flow direction may accurately detect the distribution conditions of the ice on the outer surface of the probe. Moreover, accurate judgment may be made to the type of normal-state ice according to results obtained through experiment simulation conducted in advance, which is an important basis for achieving accurate detection of the thickness of the ice.

Besides, in the above technical solution, the structure of the third segment can completely be omitted. Although such simplified structure cannot identify the icing of the large water droplets, it may still achieve the distinguishing of the types of normal-state ices.

Preferably, the second segment may comprise a transition area connected smoothly and streamliningly with the third segment.

Preferably, the third segment may comprise a stagnation area which is substantially in a shape inwardly recessed. The stagnation area functions to form a negative pressure vortex area on the outer surface of the third segment so that the large water droplets flowing thereby are trapped therein and are difficult to flow out. As such, the large water droplets take more sufficient time to form ice so that accurate detection results for the icing of the large water droplets are obtained.

Preferably, the third segment may further comprise a tail area located in the rear thereof. The tail area is used to enable the whole ice detector probe to form a substantially smooth pneumatic outer shape to reduce disturbance to the environmental flow field.

Preferably, the first segment comprises a head located at a front end, and the head has a small equivalent radius of curvature and facilitates the capture of the water droplets. Preferably, the equivalent radius of curvature substantially can be 3-6 mm.

Preferably, the ice detector probe comprises a refrigerating device located below the outer surface thereof to quicken the heat release procedure of the water droplets.

Preferably, the outer surface of the ice detector probe comprises a plurality of independent detection surfaces in its circumferential direction so that a suitable surface may be selected for detection according to environmental parameters.

Preferably, the ice detector probe may be either conformally provided on the outer surface of the aircraft or connected with the outer surface of the aircraft via a mounting bracket.

Besides, according to another aspect of the present invention, there is provided an ice detector comprising the ice detector probe according to the present invention.

BRIEF DESCRIPTION OF DRAWINGS

Preferred embodiments of the present invention will be described in detail with reference to the following figures, wherein.

DETAILED DESCRIPTION OF PREFERRED EMBODIMENTS

Figure 1:
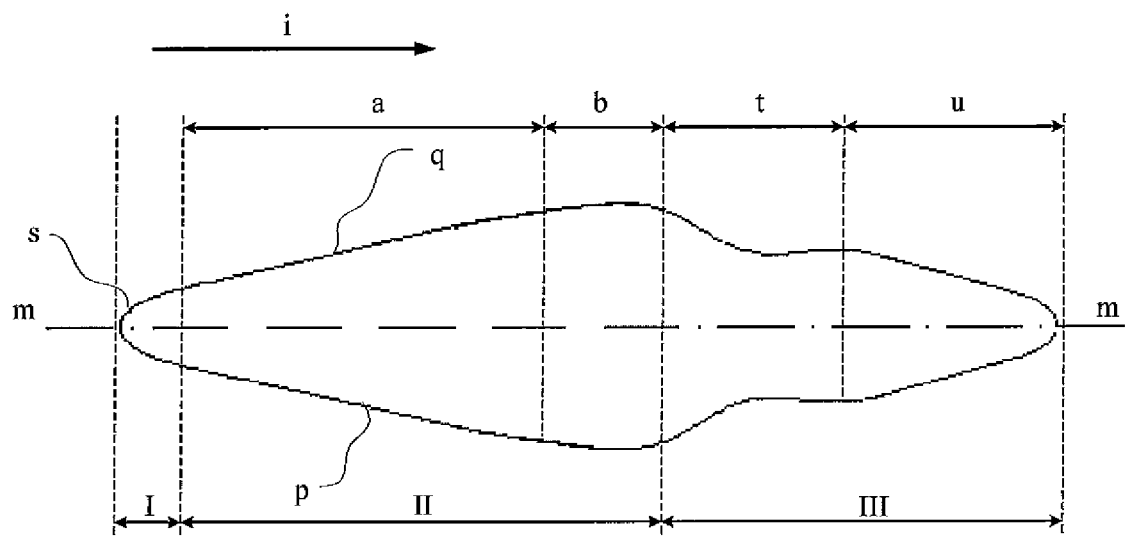
FIG. 1 is a side view of an ice detector probe according to an embodiment of the present invention.

FIG. 1 illustrates an ice detector probe according to an embodiment of the present invention. As shown in FIG. 1, it basically comprises three segments I, II and III connected in turn in an air flow direction i, each segment playing a specific role in detection of icing.

Segment I is configured to capture and collect water droplets (including normal-state water droplets and large water droplets) in the air flow for subsequent measurement. An outer surface of segment I includes a head S which cross section is a circular arc with a very small radius (e.g., 6 mm) so that the segment has an excellent property of capturing supercooled water droplets (including normal-state water droplets and large water droplets).

Segment II is configured to enable large water droplets to decelerate sufficiently and release latent heat so as to create conditions for the large water droplets forming ice in segment III shortly thereafter. This requires large water droplets to move on the outer surface of segment II continuously for a longer period of time. Therefore, the outer surface of segment II may have an enough length to meet the needs for deceleration and release of latent heat, and the outer surface may be designed in a way that the large water droplets are subjected to an action of a boundary layer during movement and cannot be blown away by the air flow.

Furthermore, segment II may further be divided in the air flow direction i so as to include a normal-state icing area a located relatively forward and a transition area b located relatively rearward. The normal-state icing area "a" may enable the normal-state water droplets to get iced sufficiently on its outer surface so as to distinguish the normal-state icing from the large water droplet icing to avoid exerting influence on detection of large water droplets. Therefore, it may have a certain length to enable the normal-state water droplets with a median volumetric diameter of less than 50 microns to decelerate differentially, release latent heat and finally get iced. The transition area "b" located rearward is used to achieve a smooth streamlining connection with segment III so as to enable the large water droplets having finished deceleration and release of the heat to continue to flow in the air flow direction i to the segment III behind.

Specifically speaking, an outer surface of the normal-state icing area "a" is in a substantially wedge shape symmetrical about line m-m as viewed from one side, two outer surfaces "p" and "q" of the outer surface are substantially in a plane and extend slantly rearwardly in the air flow direction I to form a certain angle. Furthermore, a front end of the normal-state icing area "a" is also streamliningly connected with a rear end of segment I so as to enable more water droplets to flow to segment II as much as possible.

Besides, those skilled in the art may appreciate that the two outer surfaces "p" and "q" of the wedge shape needn't be a complete plane, they may have some curves so as to present a curved surface to some degree and likewise achieve the objective of the present invention. Furthermore, the wedge-shaped normal-state icing area "a" may further play a role of further capturing and collecting water droplets in the air flow.

Furthermore, a plurality of ice sensing means may be disposed inside outer surfaces "p" and "q" of the normal-state icing area "a" and inside an outer surface of segment 1 substantially in the air flow direction. The sensing means are arranged to make accurate judgment of the type of ice so as to serve as a basis for accurately detecting the thickness of the ice.

Specifically speaking, as the normal-state water droplets differs from large water droplets, normal-state water droplets corresponding to different normal-state icing and having different median volumetric diameters also differ from one another. The normal-state water droplets corresponding to rime ice have a minimum median volumetric diameter and a minimum mass, so they decelerate and cool at the fastest rate and correspondingly are most likely to get iced. The normal-state water droplets corresponding to the clear ice have a larger median volumetric diameter and a larger mass, so they decelerate and cool slower and correspondingly are difficult to get iced. The normal-state water droplets corresponding to the mixed ice have a median volumetric diameter between those of the normal-state water droplets corresponding to the rime ice and the clear ice, so the difficulty in getting iced is also between that of the normal-state water droplets corresponding to the rime ice and the clear ice.

Therefore, when the above three types of normal-state water droplets get iced on segment I and the normal-state icing area "a", they exhibit differently. The normal-state water droplets corresponding to the rime ice can completely release their latent heat whilst they contact the head S of segment I, so if the ice type is rime ice, the ice is only distributed at the head S of segment I and its vicinity. The normal-state water droplets corresponding to the mixed ice cannot immediately completely release their latent heat when they contact the head S of segment I, wherein part of water droplets with a larger diameter, under action of the air flow, flows backward a certain distance and then begin to get iced. Therefore, if the ice type is the mixed ice, the ice will extend a distance on the outer surface of the normal-state icing area "a". The normal-state water droplets corresponding to the clear ice almost will not immediately get iced upon whilst they contact the head S of segment 1, and the captured water droplets will get iced after flowing backwards a larger distance.

Therefore, a plurality of ice detecting means (e.g., optical fiber type ice sensors) being provided and distributed in the air flow direction, a distribution scope of the ice in the air flow direction may be made clear, then the ice type is judged according to predetermined rules and considered as a basis for accurately detecting the thickness of the ice. The predetermined judging rules may be obtained by experiments, and relations between a series of environment conditions and the distribution scope of ice and the ice type may be obtained by simulating various icing conditions.

Segment III is used to enable large water droplets flowing thereby to concentrate on it and get frozen as much as possible, and not to be blown away by the air flow so as to provide accurate detection data for qualitative judgment of whether the large water droplets get iced and further quantitative analysis of the ice thickness.

Since the large water droplets sufficiently decelerate and release their latent heat whilst flowing on the outer surfaces of the previous segment I and segment II, they are more likely to become ice on segment III. In addition, a special design may be made for the shape of the outer surface of segment III so that it is capable of performing the above function better.

Specifically speaking, segment III may include a stagnation area "t" which is a recessed area with an outer surface substantively inwardly recessed, so air flow forms a negative pressure vortex area due to the influence of the shape of the outer shape when the air flow flows by the stagnation area "t". It is very difficult for the large water droplets to flee out after they get into the vortex area, so the droplets stay therein for a considerable period of time. As such, the large water droplets take sufficient time to completely release the latent heat therein and form ice, and they get iced mostly in the stagnation area "t".

In addition, segment III may include a tail area "u" in a rear portion thereof. The shape of the tail area "u" may be designed according to principles of fluid mechanics by using the prior art in a way that the whole ice detector probe forms a substantially smooth pneumatic shape so as to reduce the influence of the probe on the environmental flow field.

The content and advantages of the present invention can be understood better by briefly describing a use procedure of the probe in the present embodiment.

When the probe is disposed in the flow field, the water droplets in the air flow can be sufficiently captured by the head S of segment I and the water droplets corresponding to the rime ice can immediately release all the latent heat and form the rime ice at the head S and its vicinity. Then the remaining water droplets flow backward under the influence of air flow. When they flow by the normal-state icing area "a" of segment II, water droplets corresponding to the mixed ice and the clear ice will sequentially finish the procedure of decelerating and releasing latent heat, and respectively form the mixed ice and clear ice distributed on the outer surface of the normal-state icing area "a" in the air flow direction. In the above procedure, the large water droplets do not finish deceleration and release of latent heat as having larger size and mass, and still remain the water droplet form and continue to flow backward, and flow to segment III through the transition area "a". Furthermore, the outer surface of segment II is designed in a way that the large water droplets are subjected to an action of a boundary layer during movement and cannot be blown away by the air flow, the large water droplets can continuously decelerate and release heat on the surface of the probe forever. When the large water droplets flow to segment III, they finally form ice for detection since they already substantially finish deceleration and release of heat, and particularly, the large water droplets get iced mostly in the stagnation area "a", which is very advantageous to qualitative and quantitative detection of the icing of the large water droplets.

Figure 2:
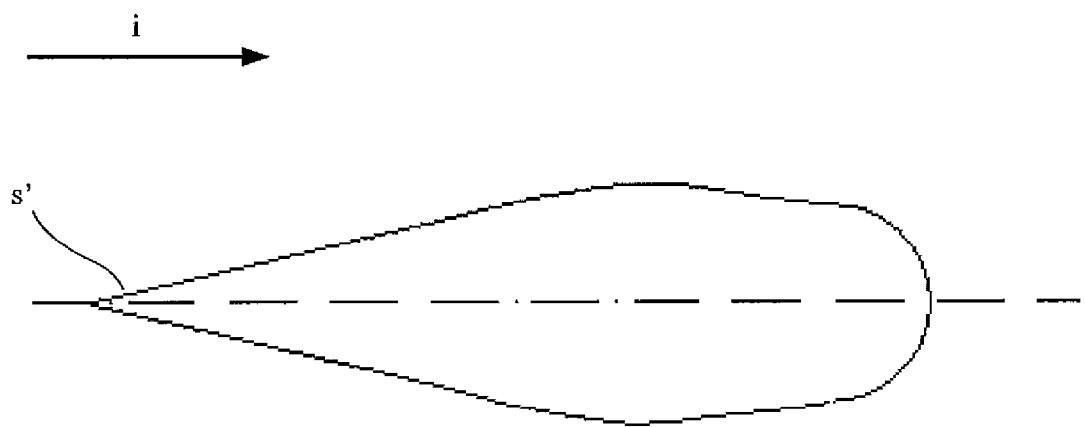
FIG. 2 is a side view of an ice detector probe according to another embodiment of the present invention.

Then referring to FIG. 2, the figure shows an ice detector probe according to another embodiment of the present invention. The probe is substantially similar to the first embodiment in structure, but different from the first embodiment in some specific features. For example, in the second embodiment, the head S' of segment I is no longer a portion of the circular arc, but a pointed tip shape so that it has a smaller equivalent radius of curvature (e.g., 3 mm) so as to obtain a higher water droplet capturing capability.

In addition, other improvements may be made to the ice detector probe according to the present invention to further improve its performance. For example, a refrigerating device may be embedded inside the outer surface of the probe so as to successively refrigerate water droplets flowing on its outer surface to shorten a total length of the probe in the air flow direction. The outer shape of the probe may be adjusted according to common technical means in the art in a way it is more liable to icing than the surface to be detected so as to give an early warning signal of icing danger before the surface to be detected gets iced. The probe may be enabled to include a plurality of different detection surfaces (for example three detection surfaces x, y and z), wherein each detection surface extends in the air flow direction and has the structure according to the present invention, and these detection surfaces are connected to one another at sides to form a closed structure. As such, the most appropriate detection surface may be selected for detection according to different environmental parameters such as an air flow speed, temperature and humidity so that the shape of the outer surface of the probe ensures that the large water droplets are subjected to an action of the boundary layer for ever whilst flowing thereon and cannot be blown away by the air flow.

Figure 3:
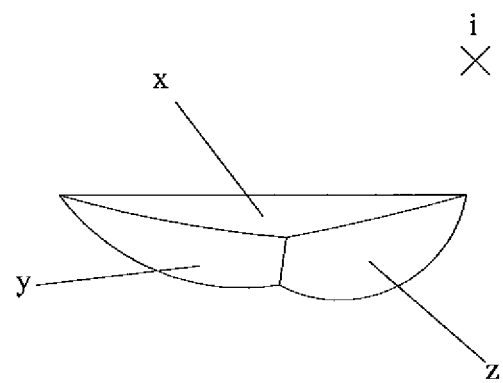
FIG. 3 is an end view of an ice detector probe in an air flow direction according to a further embodiment of the present invention.
Figure 4:
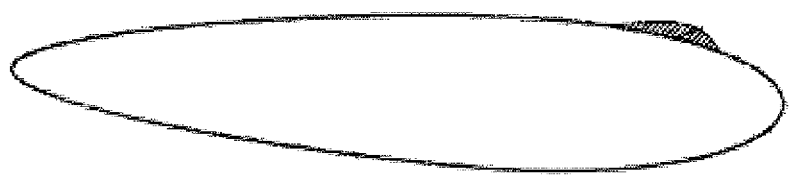
FIG. 4 is a view illustrating a mounting manner of the ice detector probe according to the present invention, wherein the probe is mounted against an outer surface of the aircraft.

Two mounting manners of the ice detector probe according to the present invention will be described hereunder. One mounting manner is shown in FIG. 4, wherein a shadow portion represents the probe according to the present invention, the probe is disposed to have a detection surface only on part of a circumferential direction so that it is tightly and conformally provided by other circumferential portions against a suitable position of the outer surface of the aircraft. In a simpler mounting manner, the ice detector probe may be provided as having a complete circumferential edge as shown by FIG. 3 and as being connected to the outer surface of the aircraft by a mounting bracket.

The above describes preferred embodiments of the present invention. However, it shall be appreciated that those skilled in the art, upon reading through the above description, can readily envisage other specific modes for implementing the present invention, wherein the specific modes are obvious. The Inventor predicts that those skilled in the art may implement proper modifications which all shall be included in the protection scope defined by the claim set.

What is claimed is:

1. An ice detector probe, comprising:
a first segment, a second segment and a third segment arranged in ordered sequence in an air flow direction, wherein an outer surface of the first segment is shaped for adapting to collect water droplets in the air flow; an outer surface of the second segment is shaped to enable large water droplets to sufficiently decelerate and release latent heat during movement thereof; an outer surface of the third segment is configured to enable large water droplets to get iced thereon, wherein the second segment further comprises a transition area for joining smoothly and streamliningly with the third segment.

2. The ice detector probe according to claim 1, wherein the second segment has a length measured in the air flow direction.

3. The ice detector probe according to claim 1, wherein the outer surface of the second segment is shaped to enable the large water droplets to be essentially continuously subjected to an action of a boundary layer during movement.

4. The ice detector probe according to claim 1, wherein the second segment comprises a normal-state icing area for normal-state water droplets to get iced thereon.

5. The ice detector probe according to claim 4, wherein the normal-state icing area is substantially configured in a wedge shape as viewed from one side.

6. The ice detector probe according to claim 4, wherein, the normal-state icing area comprises a substantially planar portion.

7. The ice detector probe according to claim 4, wherein the normal-state icing area, under the outer surface thereof, comprises a plurality of ice detecting means disposed in the air flow direction.

8. The ice detector probe according to claim 7, wherein the first segment also comprises an ice detecting means.

9. The ice detector probe according to claim 1, wherein the third segment comprises a stagnation area which is substantially in a shape inwardly recessed.

10. The ice detector probe according to claim 1, wherein the third segment further comprises a tail area located in the rear thereof, and wherein the tail area enables the ice detector probe to form a substantially smooth pneumatic outer shape.

11. The ice detector probe according to claim 1, wherein the first segment comprises a head located at a front end, and the head has an equivalent radius of curvature.

12. The ice detector probe according to claim 11, wherein the equivalent radius of curvature is substantially in a range of 3 to 6 mm.

13. The ice detector probe according to claim 1, wherein the ice detector probe comprises a refrigerating device located below the outer surface thereof.

14. The ice detector probe according to claim 1, wherein the outer surface of the ice detector probe comprises a plurality of independent detection surfaces in its circumferential direction.

15. The ice detector probe according to claim 1, wherein the ice detector probe is conformally provided on the outer surface of the aircraft.

16. The ice detector probe according to claim 1, wherein the ice detector probe is connected to the outer surface of the aircraft via a mounting bracket.

17. An ice detector, comprising the ice detector probe according to claim 1.

* * * * *